United States Patent [19]

Sato

[11] Patent Number: 4,717,927

[45] Date of Patent: Jan. 5, 1988

[54] LIQUID INJECTION RECORDING APPARATUS

[75] Inventor: Eiichi Sato, Tokyo, Japan

[73] Assignee: Canon Kabushiki Kaisha, Tokyo, Japan

[21] Appl. No.: 861,345

[22] Filed: May 9, 1986

[30] Foreign Application Priority Data

May 15, 1985 [JP] Japan .............................. 60-103073

[51] Int. Cl.[4] .............................................. G01D 15/18

[52] U.S. Cl. ............................ 346/140 R; 346/140 R

[58] Field of Search .................... 346/140 R, 140 PD; 310/317, 316

[56] References Cited

U.S. PATENT DOCUMENTS 4,471,363 9/1984 Hanaoka ........................ 346/140 R

FOREIGN PATENT DOCUMENTS 58-5271 12/1983 Japan .................................. 346/140

*Primary Examiner*—E. A. Goldberg
*Assistant Examiner*—Linda M. Peco
*Attorney, Agent, or Firm*—Fitzpatrick, Cella, Harper & Scinto

[57] ABSTRACT

A liquid injection recording apparatus which discharges liquid droplets by the contraction or expansion of a piezo-electric element and effects recording by the use of the discharged liquid droplets is provided with a wave form shaping circuit for shaping the wave form of a signal applied to the piezo-electric element, and a converting circuit for impedance-converting the wave form shaped circuit. The converted signal is applied to the piezo-electric element.

1 Claim, 6 Drawing Figures

LIQUID INJECTION RECORDING APPARATUS

BACKGROUND OF THE INVENTION

1. Field of the Invention

This invention relates to a liquid injection recording apparatus which discharges liquid droplets and effects recording by the discharged liquid droplets.

2. Related Background Art

To cause recording liquid droplets to be discharged from a liquid injection head, means is adopted for surrounding the outer wall of the pressure chamber of the injection head by electromechanical converting means such as a piezo-electric element PZ as shown in FIG. 1 of the accompanying drawings, expanding or contracting the piezo-electric element by a variation in a driving voltage applied to the piezo-electric element and causing recording liquid droplets to be discharged by the sudden contraction of the piezo-electric element after the expansion thereof.

A driving circuit therefor, as known from Japanese Patent Application Laid-Open No. 212274/1984, is designed such that a voltage in a direction opposite to the direction of polarization of the piezo-electric element is first applied to the piezo-electric element to expand the piezo-electric element and then a voltage in the direction of polarization is applied to the piezo-electric element to contract the piezo-electric element and effect discharge of recording liquid. The driving circuit is further designed such that at the next timing, no voltage is applied between the two electrodes of the piezo-electric element and the charge stored in the piezo-electric element is discharged to a resistor R provided in parallel to the piezo-electric element (FIG. 2 of the accompanying drawings). In FIG. 2, however, a switching transistor Tr2 is turned on by a control signal CO2 to expand the piezo-electric element and hold it expanded for a short time, whereafter the transistor Tr2 is turned off and simultaneously therewith, a transistor Tr1 is turned on by a control signal CO1 to thereby bring about sudden contraction of the piezo-electric element, and this has led to the possibility that the through-current from Tr1 to Tr2 is produced due to the delay of the switching time of the transistor Tr2 or the timing shift of the control signal to damage an output transistor (FIG. 3).

Also, the stability of discharge is affected by the attenuation wave form, and since the time constant thereof depends on the irregularity of the piezo-electric element, it is difficult to make the discharge characteristic uniform.

Particularly during the attenuation, the impedance of the driving circuit as viewed from the piezo-electric element is high and therefore, the vibration to which the piezo-electric element is subjected cannot be taken up, and this has led to a problem that the stability of discharge is reduced (FIG. 3).

SUMMARY OF THE INVENTION

It is an object of the present invention to overcome the above-noted disadvantages and to provide a liquid injection recording apparatus in which a signal applied to a piezo-electric element is wave form shaped and impedance-converted to thereby enable stable discharge and recording of images of high quality to be accomplished.

Other objects of the present invention will become apparent from the following detailed description of some specific embodiment thereof.

DESCRIPTION OF THE PREFERRED EMBODIMENTS

An embodiment of the present invention will hereinafter be described with reference to the drawings.

Figure 1:
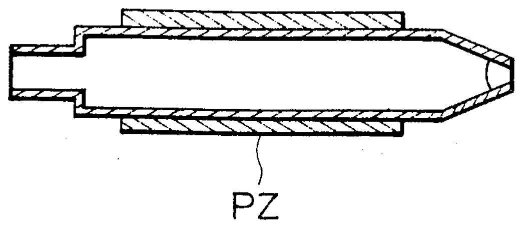
FIG. 1 PRIOR ART
FIG. 1 is a cross-sectional view of an ink jet head.
Figure 2:
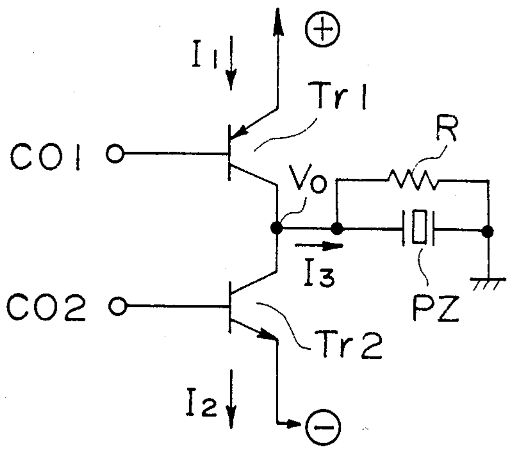
FIG. 2 PRIOR ART
FIG. 2 is a diagram of a conventional ink jet head driving circuit.
Figure 4:
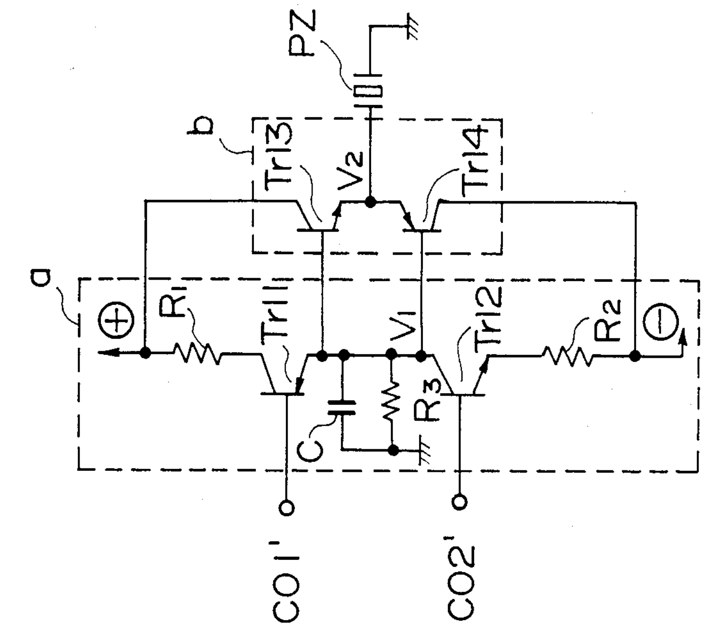
FIG. 4 is a diagram of a driving circuit for an ink jet head according to an embodiment of the present invention.
Figure 3:
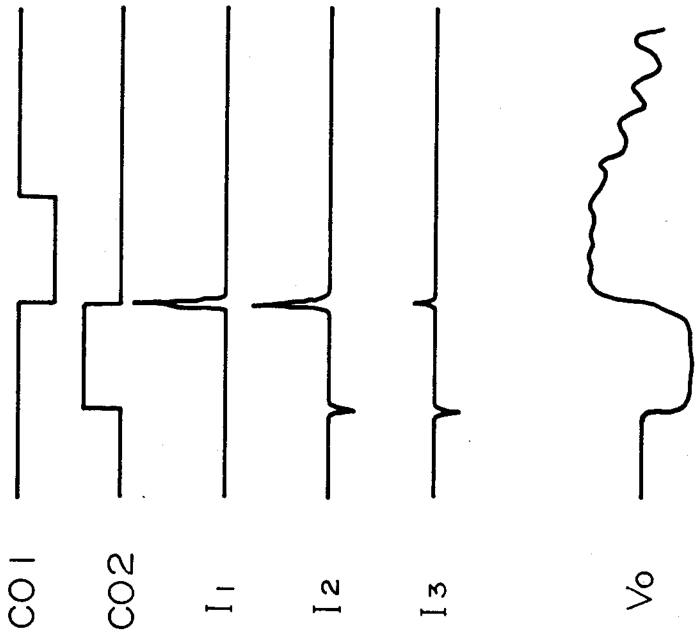
FIG. 3 PRIOR ART
FIG. 3 shows the timing wave forms of the various portions of FIG. 2.

In FIG. 4, letter "a" designates a wave form shaping circuit, Tr11 and Tr12 denote switching transistors, and R1 and R2 designate current limiting resistors. A capacitor C and a resistor R3 together constitute a time constant circuit for setting an attenuation characteristic. Tr13 and Tr14 designate impedance converting and current amplifying transistors.

Figure 5:
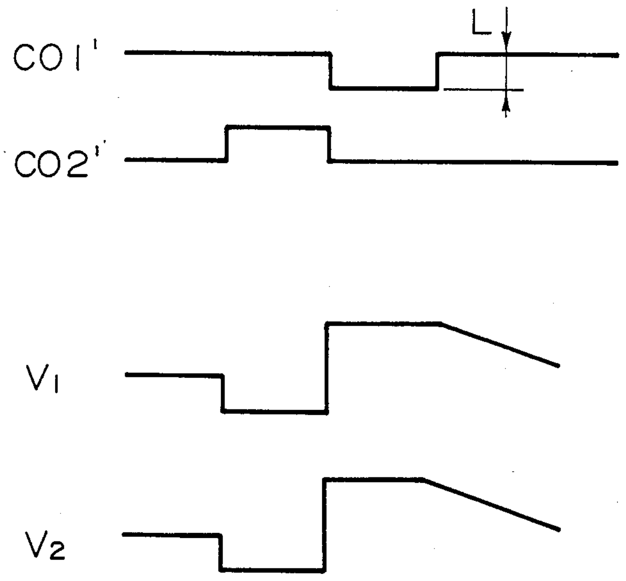
FIG. 5 shows the timing wave forms of the various portions of FIG. 4.

The operation of the circuit of FIG. 4 will now be described by reference to the timing chart of FIG. 5. When a control signal CO2′ assumes a high level, the transistor Tr12 is turned on and $V_1$ falls to the negative. Subsequently, as soon as the transistor Tr12 is turned off, a control signal CO1′ assumes a low level, and the transistor Tr11 is turned on and $V_1$ suddently reverses to the positive. Both of the transistors Tr11 and Tr12 are then turned off, and the capacitor C having the charge $V_1$ stored therein depicts a discharge curve with the aid of a resistor R3. The voltage wave form thereof is transmitted to the transistors Tr13 and Tr14, and is current-amplified thereby and applied to a piezo-electric element PZ.

The current flowing to the capacitor C at this time can be made very small as compared with the current flowing to the piezo-electric element. Accordingly, the following effects are obtained:

(i) The value of the current which effects switching becomes small, the use of small high-speed transistors becomes possible, the delay of the switching becomes small and the through-current becomes reduced; and (ii) It becomes possible to make the capacitance of the capacitor C small as compared with the capacitance of the piezo-electric element and therefore, the current limiting resistances of the resistors R1 and R2 can be changed within a range in which the rising speed during the voltage inversion does not become low. That is, the through-current can be suppressed.

The set signal continuously drives the piezo-electric element at a low impedance by the current amplifying circuit b and it is therefore apparent that unnecessary vibration produced by the piezo-electric element can also be minimized.

Further, the attenuation wave form is determined by C and R3 and therefore, the irregularity of the time constant can therefore be sufficiently suppressed depending on the type of the element.

The driving signal level L of the control signal CO1' can be varied, and the stability of discharge can be secured even when the driving signal level L is varied.

Figure 6:
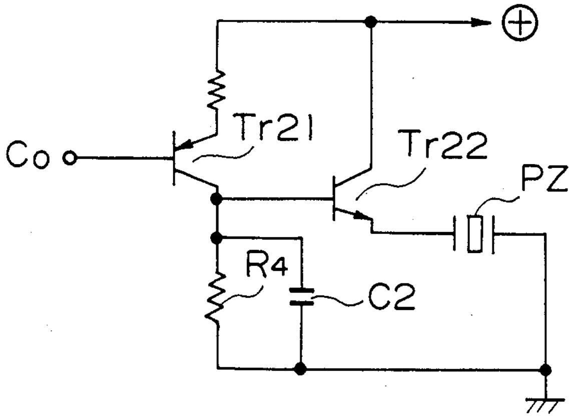
FIG. 6 is a diagram of a driving circuit for an ink jet head according to another embodiment of the present invention.

While the present invention has been described with respect to a case where there are provided two switching circuits, a similar effect will be obtained even in a case where there are three or more stages in the set voltage. In a case where there is only one switching circuit as shown in FIG. 6, there is no through-current from the first, whereas the other effects than that are sufficiently obtained.

As described above, the use of high-speed small transistors for driving the piezo-electric element becomes possible because of the switching current becoming small, and the through-current decreases because of the delay time becoming short. Also, insertion of a current limiting resistor becomes possible and the through-current decreases.

Accordingly, the possibility of the transistors being damaged is reduced. Further, by a decrease in the output impedance, the unnecessary vibration of the piezo-electric element is suppressed and the state of discharge is stabilized.

Furthermore, since the setting of the attenuation time is effected by a separate element, the error of the attenuation time decreases, the state of discharge is stabilized and images of high quality are obtained.

The present invention is effective especially in varying the volume of liquid droplets and recording half-tone images.

What I claim is:

1. A liquid injection recording apparatus including:
an injection head;
electro-mechanical converting means for effecting the discharge of liquid droplets by said injection head;
a wave form shaping circuit for shaping the wave form of a signal to be applied to said electro-mechanical converting means, wherein said wave form shaping circuit has a time constant circuit for setting an attenuation time of the signal; and
an impedance converting circuit for impedance-converting said wave form shaped signal and applying the converted signal to said electro-mechanical converting means.

* * * * *